(12) United States Patent
Li et al.

(10) Patent No.: US 10,397,948 B2
(45) Date of Patent: Aug. 27, 2019

(54) METHODS AND APPARATUSES FOR SUBFRAME SCHEDULING

(71) Applicant: Telefonaktiebolaget LM Ericsson (publ), Stockholm (SE)

(72) Inventors: Gen Li, Beijing (CN); Jinhua Liu, Beijing (CN); Cong Shi, Beijing (CN); Amitav Mukherjee, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 142 days.

(21) Appl. No.: 15/515,778

(22) PCT Filed: Nov. 17, 2016

(86) PCT No.: PCT/CN2016/106292
§ 371 (c)(1),
(2) Date: Mar. 30, 2017

(87) PCT Pub. No.: WO2018/090302
PCT Pub. Date: May 24, 2018

(65) Prior Publication Data
US 2018/0332611 A1    Nov. 15, 2018

(51) Int. Cl.
*H04W 4/00*        (2018.01)
*H04W 72/14*       (2009.01)
(Continued)

(52) U.S. Cl.
CPC ............ *H04W 72/14* (2013.01); *H04L 1/16* (2013.01); *H04W 28/0278* (2013.01);
(Continued)

(58) Field of Classification Search
CPC ... H04L 1/0061; H04L 5/0048; H04L 5/0053; H04L 5/0094; H04W 28/0278;
(Continued)

(56) References Cited

U.S. PATENT DOCUMENTS

| | | | |
|---|---|---|---|
| 9,883,404 B2* | 1/2018 | Malladi | H04W 16/14 |
| 2016/0065332 A1* | 3/2016 | Yum | H04W 72/1268 370/336 |
| 2017/0290047 A1* | 10/2017 | Islam | H04W 72/14 |

FOREIGN PATENT DOCUMENTS

| | | |
|---|---|---|
| CN | 101959135 A | 1/2011 |
| CN | 102143596 A | 8/2011 |
| CN | 105636233 A | 6/2016 |

OTHER PUBLICATIONS

PCT Written Opinion of the International Searching Authority for International application No. PCT/CN2016/106292—dated Aug. 22, 2017.
(Continued)

*Primary Examiner* — Frank Duong
(74) *Attorney, Agent, or Firm* — Baker Botts, LLP

(57) ABSTRACT

Embodiments of the present disclosure relate to methods and devices for subframe scheduling. In example embodiments, according to a method implemented in a network device is provided, a report indicating a size of uplink data to be transmitted by the terminal device is received from a terminal device. Scheduling grant information is transmitted to the terminal device indicating a first number of subframes scheduled to the terminal device for transmission of the uplink data. The first number of subframes are determined based on the report, and the first number is greater than a second number of subframes to be consumed by the transmission of the uplink data.

19 Claims, 6 Drawing Sheets

(51) Int. Cl.
    *H04L 1/16*       (2006.01)
    *H04W 72/12*      (2009.01)
    *H04W 28/02*      (2009.01)
    *H04W 74/08*      (2009.01)
(52) U.S. Cl.
    CPC ... *H04W 72/1268* (2013.01); *H04W 72/1284* (2013.01); *H04W 74/0808* (2013.01)
(58) Field of Classification Search
    CPC ............ H04W 72/12; H04W 72/1268; H04W 72/1278; H04W 72/1284; H04W 72/1294; H04W 72/14
    See application file for complete search history.

(56) References Cited

OTHER PUBLICATIONS

PCT International Search Report for International application No. PCT/CN2016/106292—dated Aug. 22, 2017.

\* cited by examiner

METHODS AND APPARATUSES FOR SUBFRAME SCHEDULING

PRIORITY

This nonprovisional application is a U.S. National Stage Filing under 35 U.S.C. § 371 of International Patent Application Serial No. PCT/CN2016/106292 filed Nov. 17, 2016, and entitled "Methods And Apparatuses For Subframe Scheduling."

TECHNICAL FIELD

Embodiments of the present disclosure generally relate to the field of telecommunication, and in particular, to methods and apparatuses for subframe scheduling.

BACKGROUND

In telecommunication networks such as those based on the 3rd Generation Partnership Project (3GPP) specifications, to facilitate uplink (UL) communication from a terminal device (which is also called as a user device or user equipment) to a network device (which is also called as a base station), the network device may schedule, upon request, UL resource such as a UL subframe in a UL grant to the terminal device using a control channel. The terminal device may send UL data in that scheduled subframe. Depending on whether the uplink data is successfully received, the network device may transmit an acknowledgement/non-acknowledgement (ACK/NACK) feedback so that the terminal device may determine whether to retransmit the UL data or not.

In some advanced services such as mobile broadband service (MBB), there is certain delay tolerance for the terminal device to obtain the ACK/NACK feedback after the transmission of the UL data. It has therefore been proposed in some new access (NX) or license assisted access (LAA) concept reports to aggregate and schedule a plurality of consecutive subframes in one UL grant. The multiple-subframe scheduling is especially suitable for new radio access techniques (NR). According to some legacy techniques, the number of subframes to be scheduled in one transmission opportunity (TXOP) (for example, 6 ms or 8 ms) is small due to the transmission time interval (TTI) length (1 ms) and the grant delay (the time from the UL grant transmission to the UL data transmission is 4 ms). For NR, the TTI length and the grant delay is much smaller (0.125 ms of TTI and much shorter grant delay) while the TXOP duration remains the same. Therefore, the number of contiguous subframes that can be scheduled in one TXOP via a UL grant is large.

According to multiple-subframe scheduling, the network device schedules a plurality of subframes in one UL grant to the terminal device using a single control channel. An ACK/NACK feedback message of correct/incorrect reception is provided for the aggregation of subframes instead of the individual subframes. This reduces both control and feedback signaling overhead. Typically, the network device decides the number of subframes to be scheduled to the terminal device based on a buffer status report (BSR) from the terminal device. The number of scheduled subframes matches exactly the buffer status reported by the terminal device. Upon receiving the scheduled subframes, the terminal device may transmit all the buffered data in just the granted subframe resources.

In use cases with uncertain channel availability, the terminal device detects whether a subframe is idle or busy before it starts a transmission in this subframe, which is called as a listen-before-talk (LBT) process. Such uncertain channel availability may occur for various reasons, one of which is the unlicensed operations. Since it is difficult for the network device to take the uncertain channel availability into account when scheduling the subframes, some of the scheduled subframes may be found to be busy though the LBT process after the grant is received. In this case, the terminal device may fail to transmit all the buffered UL data in current scheduled subframes. As a result, a new request for subframe scheduling is needed, which increases the signaling overhead and data transmission delay.

SUMMARY

In general, example embodiments of the present disclosure provide methods and apparatuses for subframe scheduling.

In a first aspect, a method implemented in a network device is provided. According to the method, a report indicating a size of uplink data to be transmitted by the terminal device is received from a terminal device. Scheduling grant information is transmitted to the terminal device indicating a first number of subframes scheduled to the terminal device for transmission of the uplink data. The first number of subframes are determined based on the report, and the first number is greater than a second number of subframes to be consumed by the transmission of the uplink data.

In some embodiments, it is determined whether a first subframe among the first number of subframes is to be excluded from use by the transmission of the uplink data. In response to determining that the first subframe is to be excluded, the first subframe is scheduled for another use.

In some embodiments, a second subframe in which the transmission of the uplink data starts is detected. It is determined whether the first subframe among the first number of subframes is to be excluded at least in part based on the location of the second subframe within the first number of subframes.

In some embodiments, Hybrid Automatic Repeat Request (HARQ) process identifiers are allocated to the first number of subframes. At least two of the first number of subframes are allocated with a same HARQ process identifier. A mapping between the HARQ process identifiers and the first number of subframes is transmitted to the terminal device.

In some embodiments, the number of the allocated HARQ process identifiers is equal to the second number, and two subframes allocated with the same HARQ process identifier has an interval of the second number of subframes.

In some embodiments, a third number of subframes are determined as being allowed to be selected by the terminal device from among the first number of subframes to transmit the uplink data. The third number is lower than the first number. An indication of the third number of subframes is included in the scheduling grant information.

In some embodiments, a duration of the first number of subframes is within a duration of a transmission opportunity (TXOP) associated with the terminal device.

In some embodiments, the report is a buffer status report, BSR.

In a second aspect, a method implemented in a terminal device is provided. According to the method, the terminal device transmits to a network device a report indicating a size of uplink data to be transmitted by the terminal device and receives from the network device scheduling grant information indicating a first number of subframes scheduled to the terminal device for transmission of the uplink data. The terminal device further transmits the uplink data to the network device in a third number of subframes among the first number of subframes. The third number is less than the first number.

In some embodiments, it is determined whether a third subframe among the first number of subframes is idle. In response to determining that the third subframe is idle, the uplink data is transmitted to the network device in the third number of subframes starting from the third subframe among the first number of subframes.

In some embodiments, the report of the size of uplink data indicates that a second number of subframes are to be consumed by the transmission of the uplink data. The third number is equal to the second number.

In some embodiments, an indication of the third number of subframes is further indicated in the scheduling grant information. The terminal device selects the third number of subframes from the first number of subframes based on the scheduling grant information and transmits the uplink data to the network device in the selected third number of subframes.

In some embodiments, the terminal device selects the third number of subframes from the first number of subframes based on the size of the uplink data and transmits the uplink data to the network device in the selected third number of subframes.

In some embodiments, a mapping between HARQ process identifiers and the first number of subframes is received from the network device. At least two subframes of the first number of subframes are allocated with a same HARQ process identifier.

In some embodiments, the number of the HARQ process identifiers is equal to the second number, and two subframes allocated with the same HARQ process identifier has an interval of the second number of subframes.

In some embodiments, a duration of the first number of subframes is within a duration of a TXOP associated with the terminal device.

In a third aspect, there is provided a method implemented in a network device. According to the method, in response to scheduling a first number of subframes for transmission of uplink data of a terminal device, a same HARQ process identifier is allocated to at least two of the first number of subframes. The first number is determined based on a report indicating a size of uplink data from the terminal device. A mapping between the same HARQ process identifier and the at least two of the first number of subframes is transmitted to the terminal device.

In a fourth aspect, there is provided a method implemented in a terminal device. According to the method, a mapping between a same HARQ process identifier and at least two of a first number of subframes scheduled by the network device for transmission of uplink data of the terminal device is received from a network device. The first number is determined based on a report indicating a size of the uplink data transmitted to the network device. HARQ retransmissions for at least a part of the uplink data in the at least two subframes are managed based on the same HARQ process identifier.

In a fifth aspect, there is provided an apparatus at a network device. The apparatus comprises a processor and a memory. The memory contains instructions executable by the processor, whereby the apparatus is operative to perform the method according to the first and/or third aspects.

In a sixth aspect, there is provided an apparatus at a terminal device. The apparatus comprises a processor and a memory. The memory contains instructions executable by the processor whereby the apparatus is operative to perform the method according to the second and/or fourth aspects.

In a seventh aspect, there is provided a computer program product that is tangibly stored on a computer readable storage medium. The computer program product includes instructions which, when executed on at least one processor, cause the at least one processor to carry out the method according to any of the first aspect to the fourth aspect.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
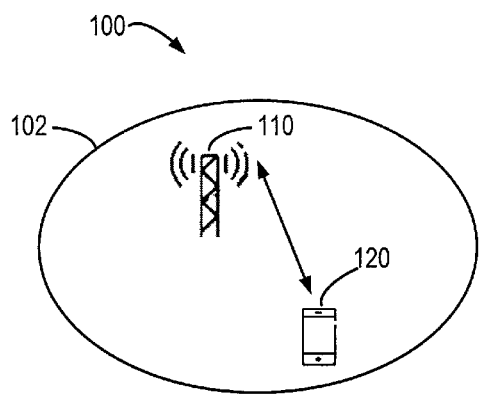
FIG. 1 is a block diagram of a communication network in which embodiments of the present disclosure can be implemented.

Principles of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a Remote Radio Unit (RRU), a radio head (RH), a remote radio head (RRH), a low power node such as a femto node, a pico node, and the like. For the purpose of discussion, in the following, some embodiments will be described with reference to eNB as examples of the network device.

As used herein, the term "terminal device" or "user equipment" (UE) refers to any device having wireless or wired communication capabilities. Examples of the terminal device include, but not limited to, personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UEs as examples of terminal devices and the terms "terminal device" and "user equipment" (UE) may be used interchangeably in the context of the present disclosure.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

FIG. 1 shows an example communication network 100 in which embodiments of the present disclosure can be implemented. The network 100 includes a network device 110 and a terminal device 120 served by the network device 110. The coverage of the network device 110 is also called as a cell 102. It is to be understood that the number of base stations and terminal devices is only for the purpose of illustration without suggesting any limitations. The network 100 may include any suitable number of base stations and the terminal devices adapted for implementing embodiments of the present disclosure. Although not shown, it would be appreciated that one or more terminal devices may be located in the cell 102 and served by the network device 110.

Typically, the terminal device 120 is operable to receive information and data from the network device 110 and to transmit information and data to the network device 110. The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

Figure 2:
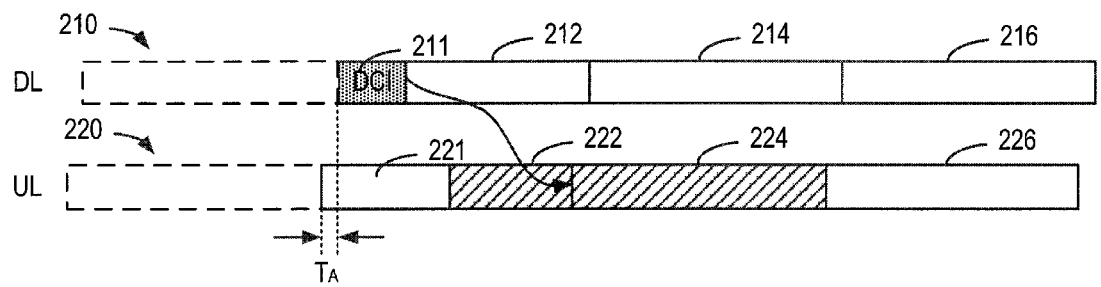
FIG. 2 is a schematic diagram of a traditional single-subframe scheduling process.

To facilitate uplink (UL) transmission of the terminal device 120, the network device 110 schedules one or more subframes to be used by the terminal device 120. In some cases, the network device 110 schedules only one subframe upon receipt of a scheduling request from the terminal device 120. Scheduling grant information is provided in downlink (DL) control information (DCI) to the terminal device 120. FIG. 2 illustrates a schematic diagram of the traditional single-subframe scheduling process. As shown, subframes 210 for DL transmission includes subframes 212, 214, 216, and so on, while subframes 220 for UL transmission includes subframes 222, 224, 226, and so on. The DL subframes 210 and the UL subframes 210 are out of synchronization by a period of $T_A$.

DCI 211 in the DL subframe 212 is regarded as a UL grant to schedule a UL subframe for the terminal device 120. The UL grant provided at the beginning of a UL subframe is typically valid for the next UL subframe (in this example, the subframe 224). That is, the terminal device 120 can transmit UL data in the subframe 224. In some other examples where the UL grant is valid for the current UL subframe (for example, the UL subframe 222), the beginning part of the UL subframe 221 is empty.

The single-subframe scheduling enables the ACK/NACK feedback for an individual subframe in a fast way so that the terminal device 120 may decide whether to retransmit the UL data. In some other cases, due to the delay tolerance for the ACK/NACK feedback, a plurality of subframes are aggregated and granted to the terminal device 120 upon a scheduling request. Specifically, the terminal device 120 transmits to the network device 110 a buffer status report (BSR) indicating a size UL data to be transmitted in UL. Upon receipt of the report, the network device 110 determines a number of subframes to be granted for the UL transmission of the terminal device 120, which matches the size of the UL data to be transmitted. That is, the terminal device 120 may be able to transmit all the buffered UL data in the scheduled subframes. Scheduling grant information indicating the scheduled subframes is transmitted from the network device 110 to the terminal device 120.

The multiple-subframe scheduling is designed to reduce the signaling overhead as analyzed above. Under such subframe scheduling, the terminal device 120 only needs to transmit one scheduling request to obtain multiple subframes. In addition, one ACK/NACK feedback message is required from the network device 110 to indicate whether UL data packets transmitted in the scheduled subframes are successfully received or not, respectively. However, due to some uncertain channel availability, one or more of the scheduled subframes may be occupied by other operations and thus are unavailable for the UL data transmission, thereby causing another process of subframe scheduling and increasing unnecessary signaling overhead.

Figure 3:
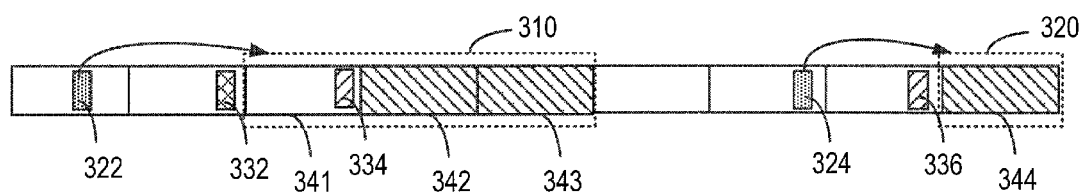
FIG. 3 is a schematic diagram of a traditional multiple-subframe scheduling.

FIG. 3 shows a schematic diagram illustrating the multiple-subframe scheduling, in which the network device 110 sends scheduling grant information 322 to the terminal device 120. The scheduling grant information 322 indicates that an aggregation 310 of three consecutive subframes 341, 342, and 343 are scheduled for transmission of UL data. Upon receipt of the scheduling grant information 322, the terminal device 120 detects, before transmitting the UL data, whether the first scheduled subframe 341 is idle or not. This process 332 is so called as a listen-before-talk (LBT) process. If the subframe 341 is used for other transmissions such as unlicensed operations of the terminal device 120 or other terminal device or network device, the LBT process fails and thus the terminal device 120 cannot perform UL transmission in this subframe. In this case, assuming a LBT process 334 is successful at the beginning of the second scheduled subframe 342, only two subframes are left for the UL transmission.

Since the terminal device 120 fails to transmit all the buffered data in the scheduled aggregation of subframes 310, it has to send another BSR to the network device 110 to request a further UL transmission. In the example of FIG. 3, further scheduling grant information 324 is transmitted from the network device 110, indicating a further aggregation 320 of subframe scheduled to the terminal device 120. The aggregation includes only one subframe 344 to match the size of the remaining UL data. With a LBT process 336, the terminal device 120 determines that the subframe 344 is idle and then transmits the remaining UL data in this subframe.

As can be seen from the example of FIG. 3, if the exact number of subframes (or transmissions/resources) matching the reported buffer status is scheduled, it is possible that the terminal device 120 cannot transmit all the buffered UL data due to the failure of the LBT process and a new process of subframe scheduling is still needed. Thus, the transmissions of the report, scheduling grant information, and ACK/NACK feedback message for the scheduled aggregation increase the signaling overhead and transmission delay for the same size of UL data, resulting in performance degradation.

In order to at least in part solve the above and other potential problems, embodiments of the present disclosure provide a new solution for subframe scheduling. Instead of scheduling the number of subframes which exactly match the number of subframes to be consumed by the transmission of the UL data, the network device schedules a larger number of subframes to the terminal device (which is also referred to as over-scheduling of subframes), so as to deal with the uncertainty of channel availability. The terminal device selects a subset of the scheduled subframes that are available for transmission of the UL data. The number of the selected subframes may be decided by the terminal device or indicated by the network device. Compared to the traditional subframe scheduling, the proposed solution increases the probability to transmit all the buffered UL data through one UL grant and avoids unnecessary signaling overhead between the terminal device and the network device, thereby improving the overall system performance.

Principle and implementations of the present disclosure will be described in detail below with reference to FIG. 4, which shows a process 400 of subframe scheduling. For the purpose of discussion, the process 400 will be described with reference to FIG. 1. As shown, the process 400 may involve the terminal device 120 and the network device 110 serving the terminal device 120.

The terminal device 120 transmits (405) to the network device 110 a report indicating a size of UL data to be transmitted by the terminal device 120. This report may be a buffer status report (BSR) in some cases and indicates the size of UL data buffered and to be transmitted by the terminal device 120 in UL. The network device 110 considers the report as a request for UL grant and determines (410) a first number of subframes scheduled to the terminal device 120 for transmission of the UL data based on the report.

According to embodiments of the present disclosure, the network device 110 schedules more subframes than what the terminal device 120 needs. If it is supposed that a second number of subframes are to be consumed by the transmission of the UL data, the first number is greater than the second number. The network device 110 may determine the second number of subframes to be consumed by the UL data based on the size of the UL data in the received report and decide to schedule more subframes than the second number of subframes for the terminal device. The scheduling of redundant subframes enables the terminal device 120 to deal with uncertainty of channel availability.

The network device 110 transmits (415) scheduling grant information to the terminal device 120 indicating the first number of subframes. In some embodiments, the network device 110 may transmit the scheduling grant information as one UL grant to the terminal device 120.

In some other embodiments, according to some specifications and use cases, the BSR, as a report, may be periodically transmitted by the terminal device 120 in a relatively long interval and thus indicates a large size of buffered UL data to be transmitted. In these cases, the network device 110 may not have enough subframes for such large UL data at present and thus may decide to schedule the subframes via multiple UL grants during a period of time. For each UL grant, a number of subframes are scheduled for only a part of the buffered UL data. The rest part of the buffered data may be transmitted by one or more other grants which are indicated by one or more other pieces of scheduling grant information. In other words, after receiving a BSR from the terminal device 120, the network device 110 may transmit multiple UL grants (with corresponding scheduling grant information) to the terminal device 120 to indicate the first number of subframes. In this case, the total number of subframes scheduled by the network device 110 (that is, the first number) is still larger than the total number of subframes to be consumed by the transmission of all the UL data (that is, the second number). In some examples, in each UL grant, the network device 110 may also schedule a larger number of subframes than that of subframes to be consumed by transmission of the corresponding part of UL data.

Alternatively, instead of informing the terminal device 120 of different numbers of subframes for transmitting different parts of the UL data in respective UL grants, the network device 110 may indicate the first number in each of the UL grants but allow the terminal device 120 to select a subset of the scheduled subframes for transmitting only a part of all the buffered UL data each time (for example, by providing an indication of a third number as described below).

The terminal device 120 selects (420), from the first number of scheduled subframes, a third number of subframes that are available for the transmission of the UL data. In accordance to embodiments of the present disclosure, the terminal device 120 is allowed to select a subset of the scheduled subframes for use. That is, redundant subframes are scheduled to the terminal device 120 mainly for the purpose of increasing the probability to transmit all the buffered UL data through one UL grant, not for transmitting more UL data than the terminal device 120 has requested. Therefore, the third number is less than the first number. The determination of the third number will be discussed in more detail below. Upon selection of the third number of subframes, the terminal device 120 transmits (425) the UL data to the network device in the third number of subframes selected among the first number of subframes.

In some cases, some of the first number of scheduled subframes may not be available for transmission of the UL data due to occupation of unlicensed operations by other devices. The terminal device 120 may select the third number of subframes from the remaining available scheduled subframes. The terminal device 120 may perform, before transmitting the UL data, a LBT process to detect whether one of the scheduled subframes is idle and transmit the UL data to the network device 110 in the third number of subframes starting from the idle subframe.

Figure 5A:
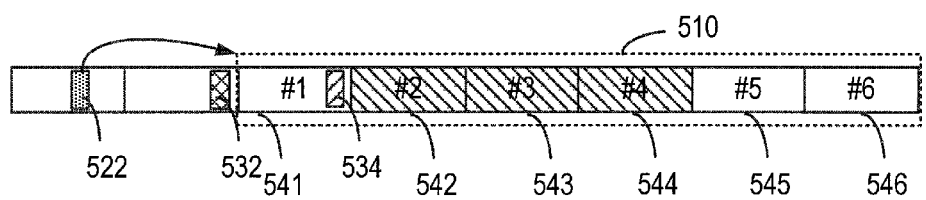
FIG. 5A is a schematic diagram of multiple-subframe scheduling according to some embodiments of the present disclosure.

FIG. 5A shows an example of the subframe scheduling. In this example, it is supposed that the network device 110 determines that three subframes are needed for transmission of the UL data based on the report received from the terminal device 120. The network device 110 schedules an aggregation 510 of six subframes 541 to 546 for the terminal device 120 in case of some of the subframes being blocked by the LBT failure. The aggregation 510 of the subframes is indicated in scheduling grant information 522 provided to the terminal device 120. Upon receipt of the scheduling grant information 522, the terminal device 120 performs a LBT process 532 to detect, at the beginning of the first scheduled subframe 541, whether the subframe 541 is busy or idle.

If the subframe 541 is blocked by the LBT failure due to other unlicensed operations, transmission of the UL data cannot be started in this subframe 541. The terminal device 129 may wait and detect, at the beginning of the subsequent scheduled subframe 542, whether this subframe 542 is idle using another LBT process 534. If the subframe 542 is detected to be available for the transmission of the UL data, the terminal device 120 may select three subframes from among the scheduled six subframes, including the idle subframe 542 and two subframes 543 and 544 subsequent to the subframe 542 for use. As can be seen, although the subframe 541 is blocked, there are still enough scheduled subframes for the terminal device 120 to transmit all of its buffered UL data.

Although it is illustrated in the example of FIG. 5A that the first scheduled subframe 541 is detected as busy, this is merely for illustration without suggesting any limitations as to the scope of the present disclosure. In other examples, zero or more than one subframe may be detected as unavailable for the transmission of the UL data. In this case, the terminal device 120 is also able to select all the scheduled subframes or the remaining available subframes for use. It would be appreciated that the busy subframe(s) is generally detected at the beginning of the scheduled aggregation of subframes. This is because the LBT process involves a contention process. If one or more subframes are selected by the terminal device 120 for the UL transmission, which means that the terminal device 120 has successfully contended for the subframes, those subframes may be blocked from other operations. It would also be appreciated that if the third number is larger than the remaining available subframes and not all the buffered UL data is transmitted, the terminal device 120 may transmit another report indicating a size of the remaining UL data in the buffered to the network device to request further subframes.

In some embodiments, the first number of scheduled subframes are consecutive subframes in time domain. The scheduling of the first number of subframes meets the requirement of the maximum transmission opportunity (TXOP) associated with the terminal device 120 for unlicensed operations. That is, the total time length of the scheduled subframes is within a duration of a TXOP. This helps avoid a new LBT process for subframe contention. In some other embodiments, the first number of subframes may be not scheduled in a contiguous manner and the scope of the present disclosure is not limited in this regard. In selecting the third number of subframes for use, the terminal device 120 may select consecutive or non-consecutive subframes from among the first number of sub frames.

In some embodiments, the third number of subframes may be determined by the terminal device 120 itself. For example, the terminal device 120 may select the third number of subframes from the first number of subframes based on the size of the buffered UL data. In this case, the third number may be equal to the second number.

Alternatively, or in addition, the third number may be indicated by the network device 110 for example in the scheduling grant information. Specifically, the network device 110 determines the third number of subframes allowed to be selected by the terminal device from among the first number of subframes to transmit the UL data and includes an indication of the third number in the scheduling grant information or in other separate information.

The third number indicated by the network device 110 may be determined based on the size of the UL data reported by the terminal device 120 and other factors such as the cell loads, the priority of the UL data, the available transmission resources, and/or the like. In some examples, the network device 110 may determine the third number of subframes so that the terminal device 120 may be able to transmit only a part of the buffered UL data. Therefore, the third number may be larger than, equal to, or even smaller than the second number of subframes to be consumed by transmission of the UL data. Upon receipt of the indication, the terminal device 120 may be allowed to select the third number of subframes or a number of subframes less than the third number from the available scheduled subframes.

In some embodiments, it is possible that one or more of the scheduled subframes are not used by the terminal device 120. The network device 110 may determine whether one or more subframes among the first number of scheduled subframes are to be excluded from use by the transmission of the UL data in advance and reschedule those subframes for another use so as to avoid wasting the transmission resources. For example, the network device 110 may detect a subframe in which the transmission of the UL data starts. Since the network device 110 is aware of the number of subframes (the third number) to be selected by the terminal device 120, it can determine which subframes are to be used for the transmission of the UL data and which subframes are left based on the location of the subframe in which the UL data starts. If it is determined that one or more subframes are to be excluded from use by the terminal device 120, the network device 110 may schedule the excluded subframe(s) for another use. For example, one or more excluded subframes can be used for UL transmission of other terminal device(s) and/or for DL transmission in the case of dynamic time division duplex (TDD).

In the example of FIG. 5A, upon reception of the UL data in the subframe 542 from the terminal device 120, the network device 110 determines that the three subframes 542 to 544 are used for the transmission of the UL data and subframes 545 and 546 are excluded from the use. Thus, the network device 110 may reschedule the subframes 545 and 546 to other terminal devices or for transmitting DL information or data to the terminal device 120 (and/or with other terminal devices).

Figure 4:
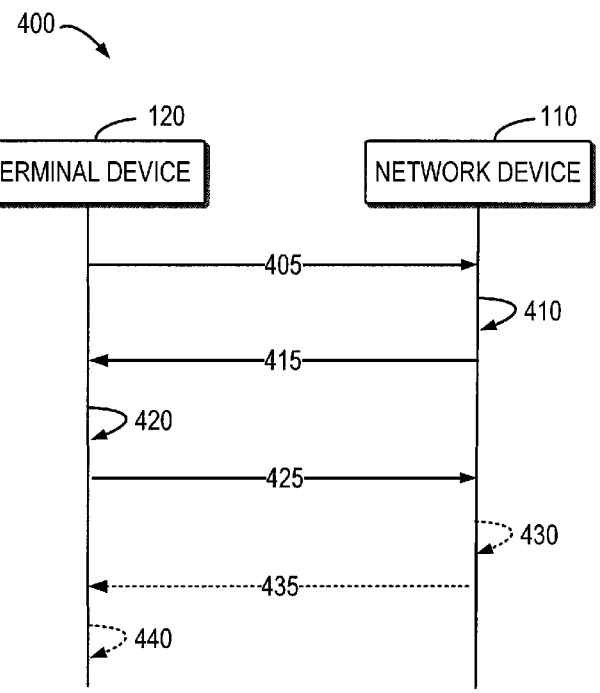
FIG. 4 is a flowchart illustrating a process of subframe scheduling according to some embodiments of the present disclosure.

Still in reference to FIG. 4, after transmission of the UL data in the third number of subframes by the terminal device 120, the network device 110 detects (430) whether the UL data is successfully received in the third number of subframes and transmits (435) a feedback message. The feedback message may include individual acknowledgment (ACK) or negative acknowledgment (NACK) feedbacks indicating whether the UL data in the third number of subframes are successfully received or not, respectively.

The terminal device 120 determines (440) whether the UL data in one or more of the subframes are to be retransmitted if corresponding NACK feedbacks for the subframes are received. The terminal device 120 may use a Hybrid Automatic Repeat Request (HARQ) process or an Automatic Repeat Request (ARQ) process to manage the retransmission in each subframe. If a part of the UL data transmitted in one or more subframes needs to be retransmitted, the terminal device 120 may request further subframes for retransmission and a similar process as the process 400 is applied.

In those embodiments where a retransmission process is employed for a subframe, the network device 110 may allocate an identifier for the retransmission process for management of the retransmission in both the terminal device 120 and the network device 110. In embodiments where a HARQ process is used, the identifier may be referred to as a HARQ process identifier. The HARQ processes are limited for the terminal device 120, each of which is responsible for managing retransmission of a part of UL data in a corresponding subframe and buffering the part of UL data until an ACK feedback for this subframe is received.

Allocation of the HARQ process identifiers to the scheduled subframes may be determined by the network device 110. In some embodiments, when the first number of subframes are granted to the terminal device 120, the network device 110 allocates HARQ process identifier to the first number of subframes. To distinguishing each of the first number of subframes, the network device 110 may allocate a different HARQ process identifier to each of the subframes. However, since the HARQ processes are limited, in some examples, the network device 110 may allocate a same HARQ process identifier to at least two of the first number of subframes. That is, two or more of the scheduled subframes share the same HARQ process identifier. In this case, a smaller number of HARQ process identifiers are allocated, which means that the terminal device 120 needs to activate less HARQ processes for the transmission of the UL data.

The network device 110 transmits a mapping between the HARQ process identifier and the first number of subframes to the terminal device 120. The mapping may be configured to the terminal device 10 via higher layer signaling such as radio resource control (RRC) signal. The network device 110 may also be configured with the mapping. Upon receipt of such mapping, the terminal device 120 may activate corresponding HARQ process based on the identifier. Then the terminal device 120 may transmit transport blocks (TBs) generated from the UL data and manage retransmission of the TBs in the mapped subframes using the activated HARQ processes.

In these embodiments, although the same HARQ process is reused for two or more subframes, various approaches may be applied to eliminate the ambiguity of the subframes. In some embodiments, the number of the allocated HARQ process identifiers may be larger than or equal to the number of subframes (the second number or the third number) that is allowed to be selected by the terminal device 120, and two subframes allocated with the same HARQ process identifier has an interval that is larger than or equal to a length of the number of allowed subframes. Since the terminal device 120 always selects a subset of the scheduled subframes for use, such allocation may guarantee that the selected subframes are allocated with different subframes.

Figure 5B:
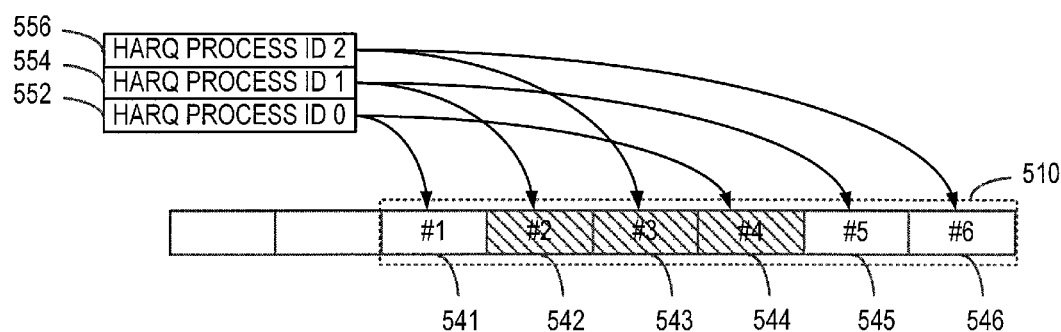
FIG. 5B is a schematic diagram of HARQ process identifier allocation according to some embodiments of the present disclosure.

FIG. 5B illustrates such an example. In this example, the six subframes 541 to 546 are determined to be scheduled to the terminal device 120. The network device 110 detects that three subframes are allowed to be used by the terminal device 120 from all the six subframes 541 to 546 and thus decides to allocate only three different HARQ process identifiers (including HARQ process ID 0 to HARQ process ID 2 542 to 546) to the six subframes 541 to 546. As shown, HARQ process ID 0 552 is allocated to two subframes 541 and 544, HARQ process ID 1 554 is allocated to two subframes 542 and 545, while HARQ process ID 2 556 is allocated to two subframes 543 and 546. If the terminal device 120 selects three subframes 542 to 544 among the six subframes for the transmission of the UL data, these three subframes are allocated with different HARQ process identifiers. Therefore, the terminal device 120 may distinguish the HARQ retransmission in these subframes using different HARQ processes.

It would be appreciated that although a same HARQ process is shown to be allocated to two different subframes, a HARQ process identifier may be allocated to more than two subframes. For example, if nine subframes are secluded to the terminal device 120, the three HARQ process identifiers, HARQ process ID 0 to HARQ process ID 2 542 to 546, may be reallocated to the seventh scheduled subframe to the ninth scheduled subframe.

In some other embodiments, it may not be possible to make sure that the selected subframes are allocated with different HARQ process identifiers. For example, this would be the case when the number of allocated HARQ process identifiers is less than the number of subframes that are allowed to be selected by the terminal device 120. In the case that more HARQ process identifiers than the number of allowed subframes are allocated, depending on the manner of the allocation, two or more subframes may also be allocated with the same HARQ process identifier and selected for use by transmission of the UL data.

In those cases, the terminal device 120 may identify from the received mapping that the same HARQ process is used for retransmission in two or more subframes. In some examples, the terminal device 120 identifies which subframes are allocated with the same HARQ process identifier based on downlink assignment indexes (DAIs) for the subframes in the mapping. If the two or more subframes are selected for transmitting the UL data, the terminal device 120 may use the corresponding HARQ process to manage or control the retransmission of the TBs in the subframes. Specifically, the part of UL data to be transmitted in those subframes is buffered in a corresponding buffer for the same HARQ process. The terminal device 120 may also determine the order of the ACK/NACK feedbacks for the transmissions in these subframes based on the corresponding scheduling grant information. If an ACK feedback is received for one of the subframes, the retransmission of the part of UL data in this subframe is stopped. If a NACK feedback is received, the part of UL data is retransmitted in a further scheduled subframe.

The HARQ process identifier allocation in the over-scheduling of subframes has been described above. In some embodiments where the network device 110 schedules the exact number of subframes that are needed for transmitting all the buffered UL data, a similar HARQ process identifier allocation may be applied to use less HARQ processes for UL transmission. Specifically, upon receipt of a report indicating the buffer status of the terminal device 120, the network device 110 determines to schedule a first number of subframes for transmission of UL data. The first number here is equal to the second number of subframes to be consumed by the UL buffered data. The network device 110 transmits scheduling grant information indicating the first number of subframes to the terminal device 120.

To facilitate HARQ retransmissions of the UL data, the network device 110 allocates HARQ process identifiers to the first number of scheduled subframes. To preserve the number of HARQ processes used for the HARQ retransmissions, the network device 110 allocates a same HARQ process identifier to two or more of the scheduled subframes. In this manner, the number of the HARQ processes to be activated by the terminal device 120 is less than the first number. The network device 110 transmits a mapping between the same HARQ process identifier and the two or more scheduled subframes to the terminal device 120. The mapping between the allocated HARQ process identifier and other scheduled subframes may also be transmitted to the terminal device 120.

Upon receipt of the mapping, the terminal device 120 manages HARQ retransmissions for the part of UL data transmitted in the two or more subframes based on the same allocated HARQ process identifier. By applying the similar approach as used in the above cases where two or more selected subframes are allocated with the same HARQ process identifier, the terminal device 120 is also be able to differentiate the HARQ retransmissions of the subframes using the same HARQ process.

Figure 6A:
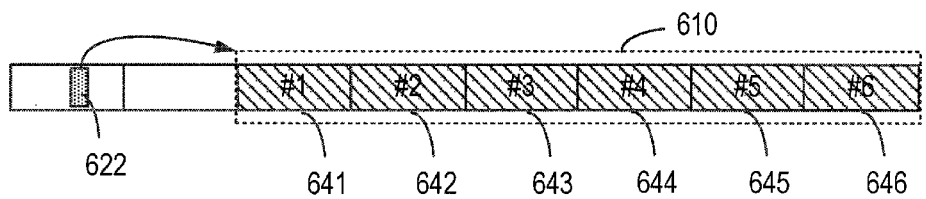
FIG. 6A is a schematic diagram of multiple-subframe scheduling according to some other embodiments of the present disclosure.
Figure 6B:
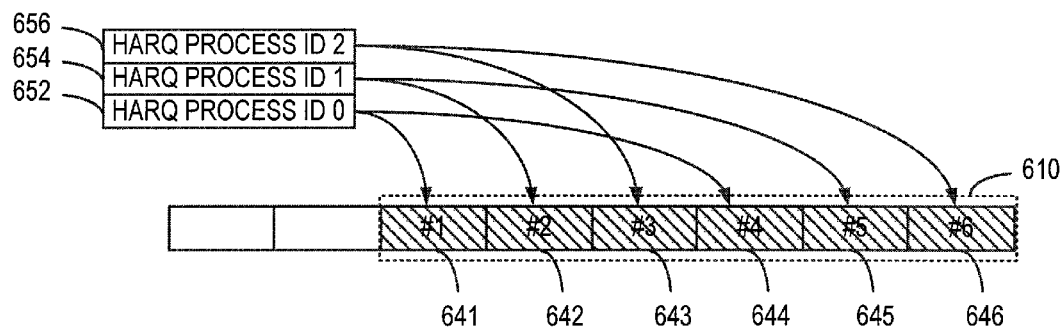
FIG. 6B is a schematic diagram of HARQ process identifier allocation according to some other embodiments of the present disclosure.

FIGS. 6A and 6B illustrate the HARQ process identifier allocation in scheduling the exact number of subframes for the terminal device. In FIG. 6A, it is supposed that the network device 110 determines that six subframes are to be scheduled for transmission of all the buffered UL data based on the report received from the terminal device 120. The network device 110 schedules an aggregation 610 of six subframes 641 to 646 to the terminal device 120, which is indicated in scheduling grant information 622. In addition, the network device 110 allocates only three HARQ process identifiers (including HARQ process ID 0 to HARQ process ID 2 652 to 656) to the six subframes 641 to 646. HARQ process ID 0 652 is allocated to the subframes 641 and 644, HARQ process ID 1 654 is allocated to the subframes 642 and 645, while HARQ process ID 2 656 is allocated to the subframes 643 and 646.

It would be appreciated that although it is illustrated in FIG. 6B that two subframes allocated with the same identifier has an interval equal to a total length of three subframes, in other examples, the same HARQ process identifier may be allocated to any two or more subframes (for example, two adjacent subframes) among the scheduled subframes. The scope of the present disclosure is not limited in this regard. The terminal device 120 may identify the ACK/NACK feedbacks for the subframes allocated with the same HAQR process identifier based on the order of the feedbacks.

Figure 7:
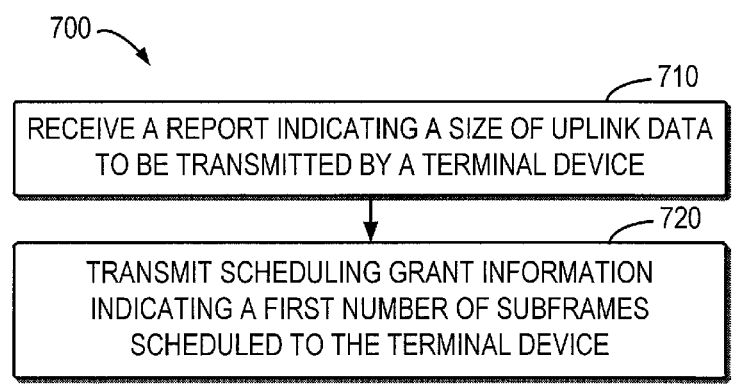
FIG. 7 is a flowchart of a method in accordance with some embodiments of the present disclosure.

FIG. 7 shows a flowchart of an example method 700 of subframe scheduling in accordance with some embodiments of the present disclosure. The method 700 can be implemented at the network device 110 as shown in FIG. 1. For the purpose of discussion, the method 700 will be described from the perspective of the network device 110 with reference to FIG. 1.

At block 710, the network device 110 receives from the terminal device 120 a report indicating a size of uplink data to be transmitted by the terminal device 120. At block 720, the network device 110 transmits scheduling grant information to the terminal device 120 indicating a first number of subframes scheduled to the terminal device 120 for transmission of the uplink data. The first number of subframes are determined based on the received report, and the first number is greater than a second number of subframes to be consumed by the transmission of the uplink data.

Figure 8:
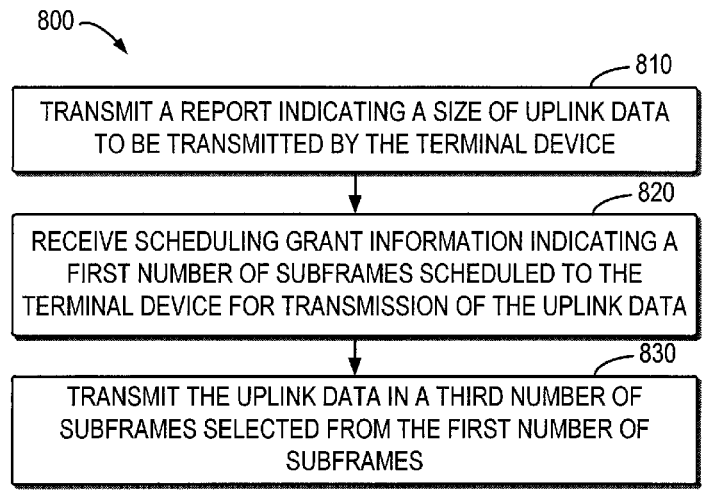
FIG. 8 is a flowchart of a method in accordance with some other embodiments of the present disclosure.

FIG. 8 shows a flowchart of an example method 800 of subframe scheduling in accordance with some other embodiments of the present disclosure. The method 800 can be implemented at the terminal device 120 as shown in FIG. 1. For the purpose of discussion, the method 800 will be described from the perspective of the terminal device 120 with reference to FIG. 1.

At block 810, the terminal device 120 transmits to the network device 110 a report indicating a size of uplink data to be transmitted by the terminal device 120. At block 820, the terminal device 120 receives, from the network device 110, scheduling grant information indicating a first number of subframes scheduled to the terminal device 120 for transmission of the uplink data. At block 830, the terminal device 120 transmits the uplink data to the network device 110 in a third number of subframes among the first number of subframes. The third number is less than the first number.

Figure 9:
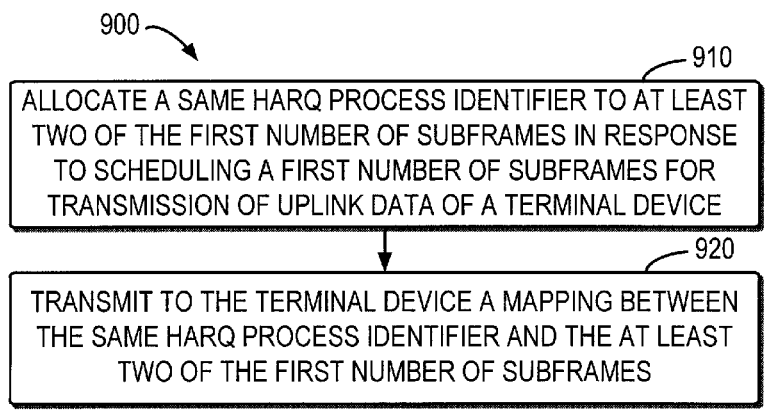
FIG. 9 is a flowchart of a method in accordance with some further embodiments of the present disclosure.

FIG. 9 shows a flowchart of an example method 900 of HARQ process identifier allocation in accordance with some embodiments of the present disclosure. The method 900 can be implemented at the network device 110 as shown in FIG. 1. For the purpose of discussion, the method 900 will be described from the perspective of the network device 110 with reference to FIG. 1.

At block 910, in response to scheduling a first number of subframes for transmission of uplink data of a terminal device, the network device 110 allocates a same HARQ process identifier to at least two of the first number of subframes. The first number is determined based on a report indicating a size of uplink data from the terminal device. At block 920, the network device 110 transmits a mapping between the same HARQ process identifier and the at least two of the first number of subframes to the terminal device.

Figure 10:
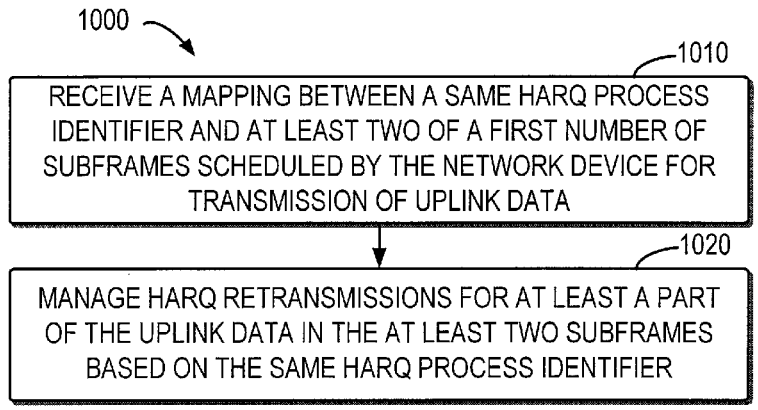
FIG. 10 is a flowchart of a method in accordance with some further embodiments of the present disclosure.

FIG. 10 shows a flowchart of an example method 1000 of HARQ process identifier allocation in accordance with some other embodiments of the present disclosure. The method 1000 can be implemented at the terminal device 120 as shown in FIG. 1. For the purpose of discussion, the method 1000 will be described from the perspective of the terminal device 120 with reference to FIG. 1.

At block 1010, the terminal device 120 receives from the network device 110 a mapping between a same HARQ process identifier and at least two of a first number of subframes scheduled by the network device 110 for transmission of uplink data of the terminal device 120. The first number is determined based on a report indicating a size of the uplink data transmitted to the network device 110. At block 1020, the terminal device 120 manages HARQ retransmissions for at least a part of the uplink data in the at least two subframes based on the same HARQ process identifier.

It is to be understood that all operations and features related to the network device 110 or the terminal device 120 described above with reference to FIGS. 4 to 6B are likewise applicable to the methods 700 to 1000 and have similar effects. For the purpose of simplification, the details will be omitted.

Figure 11:
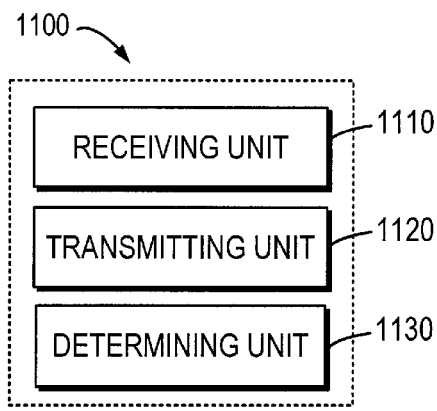
FIG. 11 is a block diagram of a network device in accordance with some embodiments of the present disclosure.

FIG. 11 shows a block diagram of a network device 1100 in accordance with some embodiments of the present disclosure. The network device 1100 can be considered as an example implementation of the network device 110 as shown in FIG. 1.

As shown, the network device 1100 includes a receiving unit 1110 configured to receive a report indicating a size of uplink data to be transmitted by the terminal device. The network device 1100 also includes a transmitting unit 1120 configured to transmit scheduling grant information to the terminal device indicating a first number of subframes scheduled to the terminal device for transmission of the uplink data. The first number of subframes are determined based on the report, and the first number is greater than a second number of subframes to be consumed by the transmission of the uplink data.

In some embodiments, the network device 1100 may further include a determining unit 1130 configured to determine whether a first subframe among the first number of subframes is to be excluded from use by the transmission of the uplink data and schedule, in response to determining that the first subframe is to be excluded, the first subframe for another use.

In some embodiments, the determining unit 1130 may be configured to detect a second subframe in which the transmission of the uplink data starts and determine whether the first subframe among the first number of subframes is to be excluded at least in part based on the location of the second subframe within the first number of subframes.

In some embodiments, the determining unit 1130 may be configured to allocate HARQ process identifiers to the first number of subframes. At least two of the first number of subframes may be allocated with a same HARQ process identifier. The transmitting unit 1120 may be configured to transmit a mapping between the HARQ process identifiers and the first number of subframes to the terminal device.

In some embodiments, the number of the allocated HARQ process identifiers is equal to the second number, and two subframes allocated with the same HARQ process identifier has an interval of the second number of subframes.

In some embodiments, the determining unit 1130 may be configured to determine a third number of subframes allowed to be selected by the terminal device from among the first number of subframes to transmit the uplink data. The third number is lower than the first number. The determining unit 1130 may be configured to include an indication of the third number of subframes in the scheduling grant information.

In some embodiments, a duration of the first number of subframes is within a duration of a TXOP associated with the terminal device.

In some embodiments, the report is a BSR.

Figure 12:
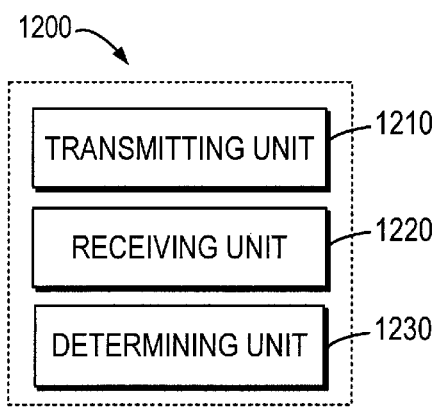
FIG. 12 is a block diagram of a terminal device in accordance with some embodiments of the present disclosure.

FIG. 12 shows a block diagram of a terminal device 1200 in accordance with some embodiments of the present disclosure. The terminal device 1200 can be considered as an example implementation of the terminal device 120 as shown in FIG. 1.

As shown, the terminal device 1200 includes a transmitting unit 1210 configured to transmit to a network device a report indicating a size of uplink data to be transmitted by the terminal device. The terminal device 1200 also includes a receiving unit 1220 configured to receive from the network device scheduling grant information indicating a first number of subframes scheduled to the terminal device for transmission of the uplink data. The transmitting unit 1210 is also configured to transmit the uplink data to the network device in a third number of subframes among the first number of subframes. The third number is less than the first number.

In some embodiments, the terminal device 1200 may further include a determining unit 1230 configured to determine whether a third subframe among the first number of subframes is idle. The transmitting unit 1210 may be configured to transmit, in response to determining that the third subframe is idle, the uplink data to the network device in the third number of subframes starting from the third subframe among the first number of subframes.

In some embodiments, the report of the size of uplink data indicates that a second number of subframes may be to be consumed by the transmission of the uplink data. The third number may be equal to the second number.

In some embodiments, an indication of the third number of subframes may be further indicated in the scheduling grant information. The determining unit 1230 may be configured to select the third number of subframes from the first number of subframes based on the scheduling grant information. The transmitting unit 1210 may be configured to transmit the uplink data to the network device in the selected third number of subframes.

In some embodiments, the determining unit 1230 may be configured to select the third number of subframes from the first number of subframes based on the size of the uplink data and thus the transmitting unit 1210 may be configured to transmit the uplink data to the network device in the selected third number of subframes.

In some embodiments, the receiving unit 1220 may be configured to receive from the network device a mapping between HARQ process identifiers and the first number of subframes. At least two subframes of the first number of subframes are allocated with a same HARQ process identifier.

In some embodiments, the number of the HARQ process identifiers is equal to the second number, and two subframes allocated with the same HARQ process identifier has an interval of the second number of subframes.

In some embodiments, a duration of the first number of subframes is within a duration of a TXOP associated with the terminal device.

In some embodiments, the report is a BSR.

Figure 13:
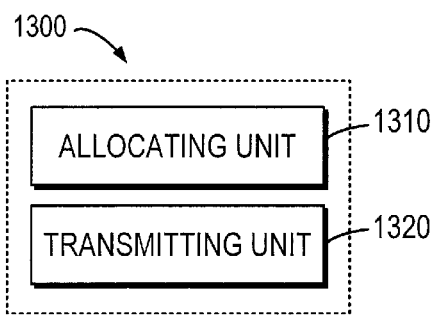
FIG. 13 is a block diagram of a network device in accordance with some other embodiments of the present disclosure.

FIG. 13 shows a block diagram of a network device 1300 in accordance with some embodiments of the present disclosure. The network device 1300 can be considered as an example implementation of the network device 110 as shown in FIG. 1.

As shown, the network device 1300 includes an allocating unit 1310 configured to allocate, in response to scheduling a first number of subframes for transmission of uplink data of a terminal device, a same HARQ process identifier to at least two of the first number of subframes. The first number is determined based on a report indicating a size of uplink data from the terminal device. The network device 1300 includes a transmitting unit 1320 configured to transmit a mapping between the same HARQ process identifier and the at least two of the first number of subframes is transmitted to the terminal device.

Figure 14:
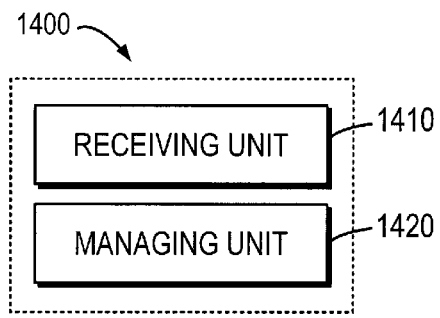
FIG. 14 is a block diagram of a terminal device in accordance with some other embodiments of the present disclosure.

FIG. 14 shows a block diagram of a terminal device 1400 in accordance with some embodiments of the present disclosure. The terminal device 1400 can be considered as an example implementation of the terminal device 120 as shown in FIG. 1.

As shown, the terminal device 1400 includes a receiving unit 1410 configured to receive from a network device a mapping between a same HARQ process identifier and at least two of a first number of subframes scheduled by the network device for transmission of uplink data of the terminal device. The first number is determined based on a report indicating a size of the uplink data transmitted to the network device. The terminal device 1400 also includes a managing unit 1420 configured to manage HARQ retransmissions for at least a part of the uplink data in the at least two subframes based on the same HARQ process identifier.

It should be appreciated that units included in the devices 1100 to 1400 correspond to the blocks of the process 400 and the methods 700 to 1000. Therefore, all operations and features described above with reference to FIGS. 4 to 6B are likewise applicable to the units included in the devices 1100 to 1400 and have similar effects. For the purpose of simplification, the details will be omitted.

The units included in the devices 1100 to 1400 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the devices 1100 to 1400 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Figure 15:
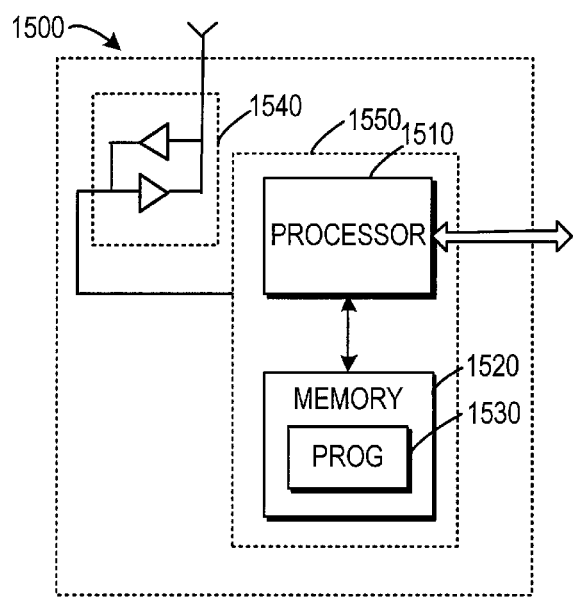
FIG. 15 is a simplified block diagram of a device that is suitable for implementing embodiments of the present disclosure.

FIG. 15 is a simplified block diagram of a device 1500 that is suitable for implementing embodiments of the present disclosure. The device 1500 can be considered as a further example implementation of the network device 110 or the terminal device 120 as shown in FIG. 1. Accordingly, the device 1500 can be implemented at or as at least a part of the network device 110 or the terminal device 120, respectively.

As shown, the device 1500 includes a processor 1510, a memory 1520 coupled to the processor 1510, a suitable transmitter (TX) and receiver (RX) 1540 coupled to the processor 1510, and a communication interface coupled to the TX/RX 1540. The memory 1510 stores at least a part of a program 1530. The TX/RX 1540 is for bidirectional communications. The TX/RX 1540 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1530 is assumed to include program instructions that, when executed by the associated processor 1510, enable the device 1500 to operate in accordance with the embodiments of the present disclosure, as discussed herein with reference to FIGS. 1 to 7. The embodiments herein may be implemented by computer software executable by the processor 1510 of the device 1500, or by hardware, or by a combination of software and hardware. The processor 1510 may be configured to implement various embodiments of the present disclosure. Furthermore, a combination of the processor 1510 and memory 1510 may form processing means 1550 adapted to implement various embodiments of the present disclosure.

The memory 1510 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1510 is shown in the device 1500, it is possible that the device 1500 includes several physically distinct memory modules. The processor 1510 may be of any type suitable to the local technical network, and may include one or more of general purpose computers, special purpose computers, microprocessors, digital signal processors (DSPs) and processors based on multicore processor architecture, as non-limiting examples. The device 1500 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 4-10. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented in a terminal device, comprising:
    transmitting, to a network device, a report indicating a size of uplink data to be transmitted by the terminal device;
    receiving, from the network device, scheduling grant information indicating a first number of subframes in a grant scheduled to the terminal device for transmission of the uplink data; and
    transmitting the uplink data to the network device in a third number of subframes in the grant among the first number of subframes, wherein the third number is less than the first number, and
    wherein the report indicates that a second number of subframes in the grant are to be consumed by the transmission of the unlink data, and
    wherein the second number of subframes is not among the first number of subframes, and the third number is equal to the second number.

2. The method of claim 1, wherein transmitting the uplink data to the network device in the third number of subframes among the first number of subframes comprises:
    determining whether a third subframe among the first number of subframes is idle; and
    in response to determining that the third subframe is idle, transmitting the uplink data to the network device in the third number of subframes starting from the third subframe among the first number of subframes.

3. The method of claim 1,
    wherein an indication of the third number of subframes is further indicated in the scheduling grant information, and
    wherein transmitting the uplink data to the network device in the third number of subframes among the first number of subframes comprises:
        selecting the third number of subframes from the first number of subframes based on the scheduling grant information; and
        transmitting the uplink data to the network device in the selected third number of subframes.

4. The method of claim 1, wherein transmitting the uplink data to the network device in a third number of subframes among the first number of subframes comprises:
    selecting the third number of subframes from the first number of subframes based on the size of the uplink data; and
    transmitting the uplink data to the network device in the selected third number of subframes.

5. The method of claim 1, further comprising:
    receiving from the network device a mapping between Hybrid Automatic Repeat Request, HARQ, process identifiers and the first number of subframes, wherein at least two subframes of the first number of subframes are allocated with a same HARQ process identifier.

6. The method of claim 5, wherein the number of the HARQ process identifiers is equal to the second number, and two subframes allocated with the same HARQ process identifier has an interval of the second number of subframes.

7. The method of claim 1, wherein a duration of the first number of subframes is within a duration of a transmission opportunity, TXOP, associated with the terminal device.

8. An apparatus at a terminal device, comprising:
    a processor and a memory, the memory containing instructions executable by the processor whereby the apparatus is operative to:
        transmit, to a network device, a report indicating a size of uplink data to be transmitted by the terminal device;
        receive, from the network device, scheduling grant information indicating a first number of subframes in a grant scheduled to the terminal device for transmission of the uplink data; and
        transmit the uplink data to the network device in a third number of subframes in the grant among the first number of subframes, wherein the third number is less than the first number, and
        wherein the report indicates that a second number of subframes in the grant are to be consumed by the transmission of the uplink data, and wherein the second number of subframes is not among the first number of subframes, and the third number is equal to the second number.

9. The apparatus according to claim 8, wherein the memory contains instructions executable by the processor whereby the apparatus is operative to:
determine whether a third subframe among the first number of subframes is idle; and
in response to determining that the third subframe is idle, transmit the uplink data to the network device in the third number of subframes starting from the third subframe among the first number of subframes.

10. The apparatus according to claim 8, wherein an indication of the third number of subframes is further indicated in the scheduling grant information, and
wherein the memory contains instructions executable by the processor whereby the apparatus is operative to:
select the third number of subframes from the first number of subframes based on the scheduling grant information; and
transmit the uplink data to the network device in the selected third number of subframes.

11. The apparatus according to claim 8, wherein the memory contains instructions executable by the processor whereby the apparatus is further operative to:
receive from the network device a mapping between Hybrid Automatic Repeat Request, HARQ, process identifiers and the first number of subframes, wherein at least two subframes of the first number of subframes are allocated with a same HARQ process identifier.

12. The apparatus according to claim 11, wherein the number of the HARQ process identifiers is equal to the second number, and two subframes allocated with the same HARQ process identifier has an interval of the second number of subframes.

13. The apparatus according to claim 8, wherein a duration of the first number of subframes is within a duration of a transmission opportunity, TXOP, associated with the terminal device.

14. The apparatus according to claim 8, wherein the report is a buffer status report, BSR.

15. An apparatus at a network device, comprising:
a processor and a memory, the memory containing instructions executable by the processor whereby the apparatus is operative to:
receive, from a terminal device, a report indicating a size of uplink data to be transmitted by the terminal device; and
transmit, to the terminal device, scheduling grant information indicating a first number of subframes in a grant scheduled to the terminal device for transmission of the uplink data, wherein the first number of subframes in the grant are determined based on the report, and the first number is greater than a second number of subframes in the grant to be consumed by the transmission of the uplink data, and
wherein the report indicates that the second number of subframes is not among the first number of subframes.

16. The apparatus according to claim 15, wherein the memory contains instructions executable by the processor whereby the apparatus is further operative to:
determine whether a first subframe among the first number of subframes is to be excluded from use by the transmission of the uplink data; and
in response to determining that the first subframe is to be excluded, schedule the first subframe for another use.

17. The apparatus according to claim 16, wherein the memory contains instructions executable by the processor whereby the apparatus is operative to:
detect a second subframe in which the transmission of the uplink data starts; and
determine whether the first subframe among the first number of subframes is to be excluded at least in part based on the location of the second subframe within the first number of subframes.

18. The apparatus according to claim 15, wherein the memory contains instructions executable by the processor whereby the apparatus is further operative to:
allocate Hybrid Automatic Repeat Request, HARQ, process identifiers to the first number of subframes, wherein at least two of the first number of subframes are allocated with a same HARQ process identifier; and
transmit to the terminal device a mapping between the HARQ process identifiers and the first number of subframes;
wherein the number of the allocated HARQ process identifiers is equal to the second number, and two subframes allocated with the same HARQ process identifier has an interval of the second number of subframes.

19. The apparatus according to claim 15, wherein the memory contains instructions executable by the processor whereby the apparatus is further operative to:
determine a third number of subframes allowed to be selected by the terminal device from among the first number of subframes to transmit the uplink data, wherein the third number is lower than the first number; and
include an indication of the third number of subframes in the scheduling grant information.

* * * * *